(12) United States Patent
Elmeguenni

(10) Patent No.: US 10,661,938 B2
(45) Date of Patent: May 26, 2020

(54) USE OF A POLY-KETONIC COSMETIC PACKAGING MATERIAL AND A DISPENSER SYSTEM FOR A PRESSURIZED PRODUCT, CONTAINING AT LEAST ONE PART MADE OF, OR INCLUDING SAID POLY-KETONIC MATERIAL

(71) Applicant: ALBEA SERVICES, Gennevilliers (FR)

(72) Inventor: Mohamed Elmeguenni, Friville Escarbotin (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 16/000,855

(22) Filed: Jun. 5, 2018

(65) Prior Publication Data

US 2018/0346176 A1    Dec. 6, 2018

(30) Foreign Application Priority Data

Jun. 6, 2017   (FR) ..................... 17 55007

(51) Int. Cl.
| | |
|---|---|
| *B65D 1/32* | (2006.01) |
| *A45D 34/00* | (2006.01) |
| *C08G 63/183* | (2006.01) |
| *C08G 67/02* | (2006.01) |
| *B05B 11/00* | (2006.01) |
| *A45D 34/02* | (2006.01) |
| *B05B 9/03* | (2006.01) |
| *B05B 11/04* | (2006.01) |
| *B05B 1/34* | (2006.01) |

(52) U.S. Cl.
CPC .............. *B65D 1/32* (2013.01); *A45D 34/00* (2013.01); *A45D 34/02* (2013.01); *B05B 9/03* (2013.01); *B05B 11/041* (2013.01); *B05B 11/309* (2013.01); *B05B 11/3045* (2013.01); *B05B 11/3066* (2013.01); *B05B 11/3074* (2013.01); *B05B 11/3077* (2013.01); *C08G 63/183* (2013.01); *C08G 67/02* (2013.01); *A45D 2200/056* (2013.01); *A45D 2200/057* (2013.01); *B05B 1/3436* (2013.01); *B05B 11/305* (2013.01); *B05B 11/3025* (2013.01); *B05B 11/3047* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,984,388 | A * | 10/1976 | Shryne .................. | C08G 67/02 528/392 |
| 5,952,066 | A * | 9/1999 | Schmidt ............... | B65D 1/0215 428/35.9 |
| 2005/0067432 | A1 * | 3/2005 | Bonneyrat ............. | B65D 23/02 222/105 |
| 2008/0099513 | A1 * | 5/2008 | Beun ...................... | A45D 34/02 222/464.1 |

(Continued)

FOREIGN PATENT DOCUMENTS

WO   WO-2015091973 A1 *   6/2015   ............. A45D 34/02

*Primary Examiner* — Vishal Pancholi
(74) *Attorney, Agent, or Firm* — Steven M. Greenberg, Esq.; Shutts & Bowen LLP

(57) ABSTRACT

Embodiments of the invention include a poly-ketonic cosmetic package for fluid dispenser systems.

12 Claims, 1 Drawing Sheet

(56) References Cited

U.S. PATENT DOCUMENTS

2008/0245380 A1* 10/2008 Ecker ................... A01K 13/002
                                                           132/114
2014/0331416 A1* 11/2014 Akinbobola ............. A61K 8/22
                                                             8/405
2016/0311566 A1* 10/2016 Cocaud .................. A45D 34/02

* cited by examiner

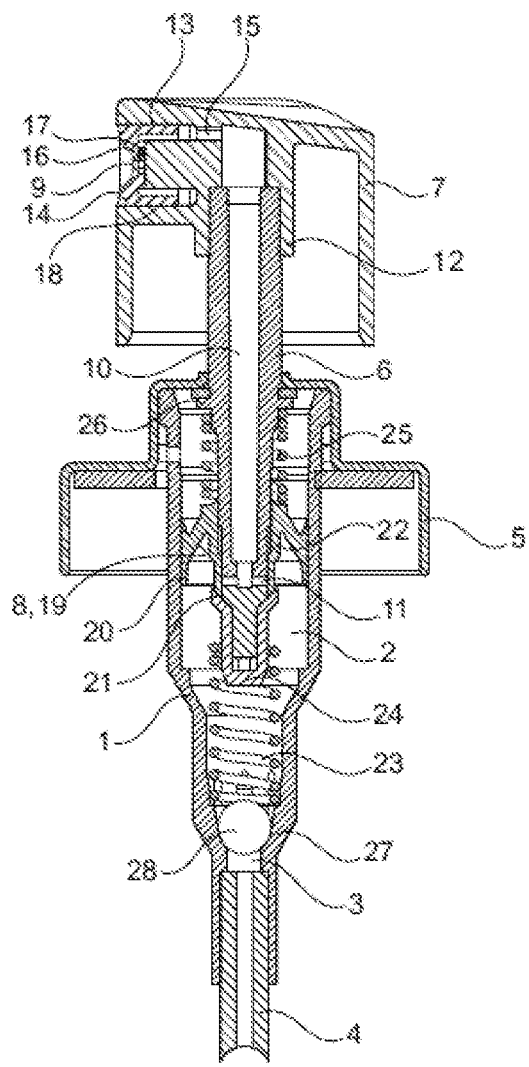

USE OF A POLY-KETONIC COSMETIC PACKAGING MATERIAL AND A DISPENSER SYSTEM FOR A PRESSURIZED PRODUCT, CONTAINING AT LEAST ONE PART MADE OF, OR INCLUDING SAID POLY-KETONIC MATERIAL

CROSS REFERENCE TO RELATED APPLICATIONS

This application claims priority under 35 U.S.C. § 119(a) to French Patent Application Serial Number 1755007, filed Jun. 6, 2017, the entire teachings of which are incorporated herein by reference.

BACKGROUND OF THE INVENTION

Field of the Invention

The invention relates to a material used in cosmetic packaging, in particular for liquid dispenser systems of a pressurized product, to be integrated in a cosmetic packaging.

Description of the Related Art

Dispenser systems that include a body featuring the means to collect a product packaged in a bottle to supply an internal chamber of the body are well known. In particular, the dispenser system can be in the form of a manually-operated pump or a valve that is used to dispense, under pressure, a product packed in a bottle. This dispenser system includes a stem on which is mounted a push button that can be reversibly operated. The stem features a valve located in the internal chamber and moves from a stable state whereby the dispenser path formed through said stem and push button to the dispensing orifice is closed, and a state imposed by actuation of the stem, wherein said dispenser path communicates with the internal chamber to allow the pressurized output of the product.

When actuated, the stem undergoes significant mechanical stress that requires the use of a material that is sufficiently rigid to prevent, by deformation of said stem, any alteration of the functioning of the dispenser system. In particular, these deformations could cause the stem to break or a loss of the sealing properties of the assembly, on the stem, of the valve and/or push button, as these members are generally made of a material that is more flexible than the stem.

The push button can feature a housing wherein the dispenser path opens, whereby a nozzle with a dispensing orifice is mounted in said housing. Considering the stress generated by the pressure of the product in the dispenser path, it is necessary to ensure the mechanical strength of the nozzle assembly and of the stem in the push button. Proper mechanical strength requirements also apply to the other elements of the dispenser system, such as the pump body in particular.

Some components of a dispenser system, such as the stem, the body and the nozzle, are made of a polymer of the polyacetal family, specifically in poly-oxymethylene (POM), also known as acetal. The implementation of this material is satisfactory, in particular in terms of its mechanical and chemical properties, slippage, dimensional stability, and low moisture absorption. However, it is now a recognized fact that POM presents some toxicological risks, mainly due to formaldehyde emissions during its hot injection in the manufacturing molds, and during the destruction of the dispenser systems of end-of-life products.

Furthermore, various guidelines regulate, govern and limit the presence of substances that are potentially hazardous to human health, in particular in cosmetic products, which is driving the cosmetic industry to limit, and even remove from their formulae any preservatives that can often cause allergies or intolerances. Cosmetic products are therefore becoming more fragile, more readily contaminated by bacteria and fungi, and more sensitive to contact with air, which can cause drying or oxidation of the product.

In some dispenser systems, the body of the pump can also contribute to the sealing. However, POM is too porous to be able to contribute to the proper preservation of the product before dispensing. The air can diffuse through POM in sufficient quantities to contaminate and/or oxidize the product contained in the stem between two dispenser operations, and the product can also dry by evaporation through said POM stem. Therefore, a pump body made of POM does not feature sufficient sealing.

Furthermore, due to regulatory evolutions and changing product formulations, the pharmaceutical and cosmetic industries might be made to sterilize their dispenser systems to prevent contaminating the product before initial dispensing. In particular, a quick and efficient way of sterilizing a product dispensing system is to expose it to gamma or beta radiation, a method specifically used for the sterilization of closed spaces. However, the radiation tends to alter POM properties, by weakening it mechanically and by changing its appearance. Therefore, dispenser systems wherein certain components, such as the stem, the body or the nozzle, are made of POM must undergo gas sterilization, with ethylene oxide in particular, but this system is less efficient and more difficult to implement industrially than traditional gamma or beta radiation.

POM used as a cosmetic packaging material has numerous disadvantages, in particular in terms of salting out of toxic products. There is therefore a need to use a material that does not have the disadvantages of POM, while retaining its mechanical and chemical properties in order to reduce changes of the industrial tools, and in particular the molds.

BRIEF SUMMARY OF THE INVENTION

Embodiments of the present invention address deficiencies of the art in respect to the use of POM in cosmetic packaging and provide a novel and non-obvious utilization of a poly-ketonic material in fluid dispenser systems. In this regard, the purpose of the present invention is to solve the foregoing technical problems by proposing to use a poly-ketonic material in cosmetic packaging, in particular for the fluid dispenser system, in part or in full, whereby said material features mechanical and chemical properties close to that of POM, but without the salting out of toxic substances and in which the material includes or is made of a poly-ketone (POK). In this regard, the POK material meets the physical and chemical requirements applicable in the field of cosmetic packaging and do not salt out toxic degradation products.

The invention can include any of the following features, taken individually or in any technically-feasible combination:
  the POK is an aliphatic POK,
  the POK features repeated patterns according to the following formula I:

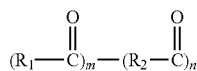

Wherein m and n are integers that are greater than or equal to 1,

R1 and R2, identical or different, each separately represents an alkylene group, possibly replaced with:

an alkyl group, an alkyne group, a hydroxyl group, an amine group, and amide group, a halogen atom, a carboxyl group, the sequence of repetition patterns can be random or ordered, R1 is an ethylene group, and R2 is a propylene group, the n/m ratio is smaller than or equal to 1/4, the POK is defined by the following formula A:

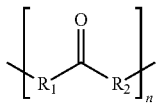

Wherein n is an integer that is greater than or equal to 1,

R1 and R2, identical or different, each separately represents an alkylene group, possibly replaced with an alkyl group, the poly-ketonic material meets the regulatory requirements applicable in the field of cosmetics, specifically in that it doesn't salt out hazardous carcinogenic substances after its degradation, the mechanical properties of the poly-ketonic material are not altered by beta and gamma radiations of up to at least 15 kGy, the mechanical properties of the poly-ketonic material are not altered by beta and gamma radiations of up to at least 250 kGy, the poly-ketonic material features thermal stability at up to at least 200° C.

the poly-ketonic material features a shrinkage rate greater than or equal to 1.5% and lesser than or equal to 2.5%.

In particular, the purpose of the invention is to improve the prior art by proposing a dispenser system of a pressurized product, in particular intended to be integrated in a cosmetic packaging, whereby said system features at least one part made of, or including the poly-ketonic material, and whereby the poly-ketonic material is made of or includes a POK.

The invention can include any of the following features, taken individually or in any technically-feasible combination:

the dispenser system includes a pump made of the poly-ketonic material, in particular according to one of the forms described above, said pump includes a body, said body also includes a stem and a push button mounted on said stem and used to reversibly actuate said stem, in particular by linear motion in said body, the body of the pump is made of the poly-ketonic material, said body is fitted with means enabling it to supply an internal chamber of said body with the product coming from a source, said stem includes a valve located in the internal chamber, that features a stable state whereby the dispenser path formed through said stem and push button to the dispensing orifice is closed, and a state imposed by actuation of the stem, wherein said dispenser path communicates with the internal chamber, the stem is made of the poly-ketonic material, the push button features a housing wherein is mounted a nozzle with a dispensing orifice, the nozzle is made of the poly-ketonic material, a return spring in a stable state of the stem after actuation on a dispenser stroke is made of the poly-ketonic material.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 shows a longitudinal cross section of an example of the dispenser system of a pressurized product

DETAILED DESCRIPTION OF THE INVENTION

The present invention is better understood upon reading the following description, which is provided only as an example and is not limited thereto, and with reference to FIG. 1 that shows a longitudinal cross section of an example of the dispenser system of a pressurized product. In order to replace POM in certain cosmetic packaging, numerous materials have been tested by the applicant. In particular, tests were conducted on these different materials to determine whether their chemical and mechanical properties were close to that of POM. Usability tests were also conducted on materials used for the manufacturing of certain parts used in cosmetic packaging. Among these, materials of the POK family yielded very good results.

POK features mechanical and chemical properties that are similar to that of POM, and the use of these new materials should therefore not imply significant changes to the manufacturing process of parts formerly made of POM. POKs are a family of high-performance thermoplastic polymers. They come in two categories: aliphatic polyketones and aromatic polyketones. The aromatic polyketone of polyether ether ketone (PEEK) is an example of the latter. POKs feature good mechanical properties and resistance to solvents.

A subset of POKs feature repeated patterns according to the following formula I:

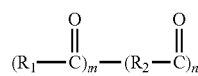

I

Wherein m and n are integers that are greater than or equal to 1,

R1 and R2, identical or different, each separately represents an alkylene group, possibly replaced with:

an alkyl group, an alkyne group, a hydroxyl group, an amine group, and amide group, a halogen atom, a carboxyl group, the sequence of repetition patterns can be random or ordered.

According to this definition, a POK is a polymer made of a plurality of repetition patterns such as the ones defined above. A first repetition pattern includes the grouping R1 and a carbonyl group. This first pattern in repeated m times in the polymer. A second repetition pattern includes the grouping R2 and a carbonyl group. This second pattern is repeated n times in the polymer. The sequence of repetition patterns can be random or ordered. When the repetition patterns are randomly sequenced, the polymer is called statistical polymer. When the sequence of repetition patterns is ordered, the polymer is called multiblock polymer.

An example of a POK is represented by the following formulae:

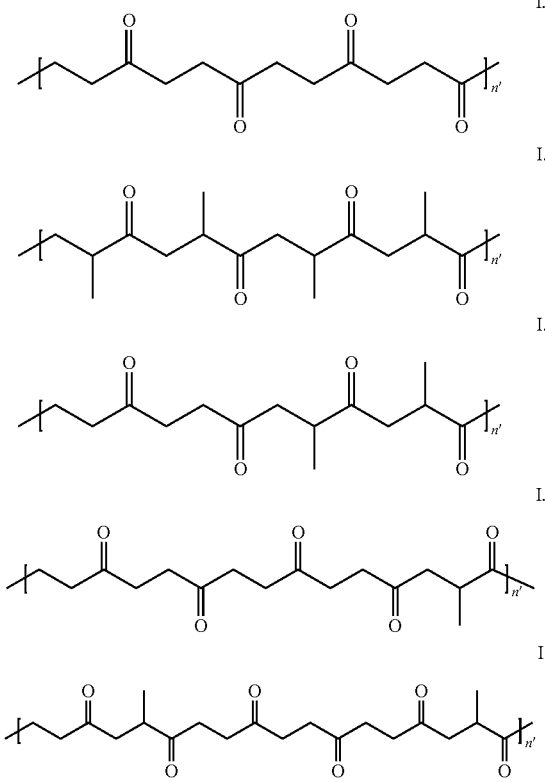

In another possible definition, the POK is defined by the following formula A:

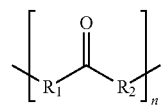

A

Wherein n is an integer that is greater than or equal to 1,

R1 and R2, identical or different, each separately represents an alkylene group, possibly replaced with:

an alkyl group, an alkyne group, an aryl group, and hydroxyl group, an amine group, an amide group, a halogen atom, a carboxyl group.

The elongation and Young's elastic modulus of the POK contribute to its exceptional resistance to cyclic stress, under tensile and flexure strain. This material also features better resistance to ageing and creep strength than POM.

POK also features good resistance to sterilization by beta and gamma radiation, and its properties undergo no deterioration at up to around 300 kGy.

POK meets the regulatory requirements applicable in the cosmetics industry and does not salt out formaldehyde or any other degradation products considered as hazardous and/or carcinogenic substances.

Furthermore, POK features the same shrinkage rate as POM. Therefore, POK can be used for the manufacturing of parts intended to be used in cosmetic packaging, by implementing the same manufacturing processes and tools as those used for POM.

POK and POM are usable within the same process, at the same injection temperature (for example 225-230° C.) and at the same mold temperature (for example 80° C.). Both feature similar shrinkage rates and problem-free de-molding processes. In particular, for both POK and POM, there is no polymer cross-link issue that would cause the polymer to stay trapped in the mold.

POK therefore appears to be the best adapted materials for use in cosmetic packaging, in particular with a production line formerly used for POM.

The example I.A relates to a POK according to the formula I, wherein R1 and R2 are ethylene groups. This POK is highly crystalline, which might render the poly-ketonic material brittle when subject to excessive mechanical stress.

The example I.B relates to a POK according to formula I, wherein R1 and R2 are propylene groups.

Advantageously, the poly-ketonic material is a POK according to the formula I, wherein R1 is an ethylene group and R2 is a propylene group. Therefore, a first polymer repetition pattern includes an ethylene group, and a second repetition pattern includes a propylene group. The presence of a propylene group can be used to modify the rheological and mechanical properties of the material. The examples I.C and I.D relate to such POKs.

Furthermore, the poly-ketones represented in examples I.C and I.D correspond to multiblock polymers, because the first and second repetition patterns are ordered. It is indeed clear that the first repetition patterns form a first block and that the second repetition patterns form a second block. Inversely, the poly-ketone shown in example I.E corresponds to a statistical polymer, because the repetition patterns are randomly distributed.

Advantageously, for a POK according to the formula I, wherein R1 is an ethylene group and R2 is a propylene group, the n/m ratio is smaller than or equal to 1/2. Therefore, for a propylene group, the polymer includes two ethylene groups.

Advantageously, for a POK according to the formula I, wherein R1 is an ethylene group and R2 is a propylene group, the n/m ratio is smaller than or equal to 1/4. Therefore, for a propylene group, the polymer includes four ethylene groups. The I.D example corresponds to such a POK. For a POK according to formula I, wherein R1 is an ethylene group and R2 is a propylene group, the n/m ratio can also be smaller than or equal to 1/8, and even 1/16.

The presence in small proportions of propylene influences the crystallization of the product and improves the mechanical properties of POK, by making it more resistant. The POK identified as particularly advantageous in terms of the results achieved is marketed by AKRO-PLASTIC, under the name of "AKROTEK® PK".

According to another possible definition, the poly-ketonic material according to the formula I includes or is made of, advantageously, a POK formed from a carbon monoxide/ethylene/propylene terpolymer.

In a preferred embodiment, regardless of the nature of the poly-ketonic material used in cosmetic packaging, in particular in fluid dispenser systems intended to be included in the cosmetic packaging, said poly-ketonic material selected according to the invention does not salt out carcinogenic hazardous substances after its degradation.

For the purpose of undergoing sterilisation by radiation, for example beta and/or gamma radiation, the poly-ketonic material is selected to ensure that its properties are not altered by beta and/or gamma radiation of up to at least 15 kGy.

Advantageously, its properties are not altered by beta and gamma radiations of up to at least 250 kGy.

The poly-ketonic material features good thermal stability at up to at least 200° C. and can therefore be used in the existing manufacturing process.

Advantageously, the poly-ketonic material features a shrinkage rate greater than or equal to 1.5% and smaller than or equal to 2.5%, so it can be used in a process formerly used with POM.

The present invention also relates to a dispenser system of a pressurized product, in particular intended to be integrated in a cosmetic packaging, whereby said system features at least one part made of, or including the poly-ketonic material defined above.

In particular, said dispenser system can include a pump made of the poly-ketonic material. The poly-ketonic material can be a POK.

Advantageously, the poly-ketonic material is an aliphatic POK.

Also advantageously, the POK features repeated patterns according to the following formula I:

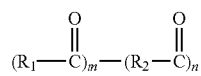

Wherein m and n are integers that are greater than or equal to 1,

R1 and R2, identical or different, each separately represents an alkylene group, possibly replaced with:

an alkyl group, an alkyne group, an aryl group, and hydroxyl group, an amine group, an amide group, a halogen atom, a carboxyl group.

Advantageously, for a POK according to the formula I, R1 is an ethylene group and R2 is a propylene group.

Also, advantageously, for a POK according to the formula I, wherein R1 is an ethylene group and R2 is a propylene group, the n/m ratio is smaller than or equal to 1/4.

In reference to FIG. 1, the following is a description of a manually-actuated dispenser system for dispensing a pressurized product, for example as a spray, a dollop or a continuous flow, depending on the nature of said product. In one application example, the product is in the form of a fluid, a lotion, a gel or a cream, for use as a cosmetic, a perfume or pharmaceutical treatments.

This system is described as an example, and any dispenser system for pressurized products known to a person skilled in the art can be used for the purpose of the present invention.

The dispenser system in FIG. 1 includes a dispensing pump arranged to supply a liquid product in the form of a spray. However, the invention is not limited to a single type of dispenser system, nor to a specific form of dispensing.

The pumps, made of porous materials of the POM-type, are poor barriers against the evaporation of the components of the formulae, in particular of perfumes. The most volatile components, i.e. the aromas, or the fragrance of perfumes, are the first to escape through the porosity of the materials.

The pump according to the invention can be made, in part or in full, out of a poly-ketonic material, in particular a POK such as described above. POK constitutes a very good barrier because of its low porosity. The preservation period of perfumes and cosmetics in a pump made out of POK is therefore increased.

The pump includes a body 1 wherein is formed an internal chamber 2 that is supplied with product from a source, whereby said body is fitted with means to supply said internal chamber. For this purpose, the body 1 features a supply orifice 3 for example equipped with a dip tube 4 communicating with the interior of a packaging bottle containing a product for the purpose of its extraction.

The body 1 of the pump can also be made out of the material M. The body 1 can be made from POK. The body 1 can be fitted with a peripheral collar 5 that enables the sealed assembly of said body on the neck of a bottle, whereby the supply orifice 3 communicates with the product packaged in said bottle. According to the shown embodiment, the collar 5 is deformable, being made of aluminium for example, which allows it to be tightly crimped around the neck. However, the invention is not limited to a particular embodiment of the mounting of the dispenser system on the bottle, which can also be achieved by screwing, welding or sealed clipping.

The dispenser system includes a stem 6 that brings the pressurised product that is located in the body 1, whereby it is reversibly actuated in linear motion over a dispensing and suction stroke of said product by means of a push button 7 mounted on said stem.

The stem 6 includes an outlet valve 8 located in the internal chamber 2, and that features a stable state whereby the dispenser path formed through said stem 6 and push button 7 to the dispensing orifice 9 is closed, and a state imposed by actuation of the stem, wherein said dispenser path communicates with the internal chamber.

Therefore, the dispensing of the product is achieved by pressing a finger on the push button 7 to move it axially by actuating the linear motion of the stem 6, for the purpose of bringing the product from the internal chamber 2 to the dispensing orifice 9, through which the product exits.

Considering the various constraints it undergoes in the context of its use, the stem 6 is made of a material that is sufficiently rigid to prevent alterations of the system's functioning due to deformations of said stem. Furthermore, the material of the stem 6 must feature satisfactory sliding properties and good resistance to wear and creeping. For this purpose, the material of the stem 6 must include at least one POK material. The use of a POK material can also contribute to the proper conservation of the dispensed product. Indeed, the porosity of the material is weak enough to prevent air and water from diffusing through the stem 6, which limits the contamination, drying and/or oxidizing of the product contained in said stem between two dispenser operations. Furthermore, the material M retains its properties, in particular its mechanical strength and appearance, under gamma or beta radiation, which enables a quick and efficient sterilization of the dispenser system.

Consequently, a bottle according to the invention is particularly advantageous in terms of dispensing a product with a limited or non-existent content in preservatives and/or that is to undergo a sterilization process.

Furthermore, the use of a POK material limits toxicological risks, in particular because it will not salt out toxic components when heated or upon its end-of-life destruction. Additionally, the stem 6 made of a POK material can be made by molding, using the tools and following the injection steps traditionally used for the components of a dispenser system made out of POM.

The dispenser path runs through an internal channel 10 formed in the stem 6, whereby said channel communicates with the two upstream radial orifices 11 and opens into the upper end of said stem. The push button 7 features a shaft 12 mounted around the upper end of the stem 6 so as to route the dispenser path through the internal channel 10 and said shaft.

The push button 7 features a housing 13 wherein the dispenser path opens, whereby a nozzle 14 with a dispensing orifice 9 is mounted in said housing. The nozzle 14 communicates with the shaft 12 through a channel 15 in the push button 7, whereby the dispenser path runs through said channel.

According to the shown embodiment, the dispenser path leads to a vortex chamber 16 formed between the nozzle and a surface 17 of the housing 13, whereby said vortex chamber is fitted with the dispensing orifice 9. This embodiment enables to swirl the liquid product very quickly in the vortex chamber 16, for the purpose of supplying said product in the form of a spray through the dispensing orifice 9. In a variant, used in particular for more viscous products, the nozzle 14 can be in the form of an extension tube.

Considering the stress generated by the pressure of the product in the dispenser path, which is of around 5 to 7 bars, it is necessary to ensure the mechanical strength of the nozzle 14 assembly and of the stem 6 in the push button 7. For this purpose, the assembly is achieved by press fitting, whereby the nozzle 14 features a radial protrusion 18 that provides the anchoring means in the housing 13.

The nozzles must achieve an excellent hold in the bodies of the push buttons so as not to be projected under the output pressure when a user operates the pump. For this purpose, they are traditionally made of POM, and secured to the softest material of the body of the push button, such as a polyolefin, in order to verify the 30-bar test pressure.

However, when a new nozzle is installed in the housing of the body of the pump, the anchors are worn or planed, and the hold of the nozzle is thereby reduced. With POK, the profile of the anchors remains unchanged and the hold is largely improved.

To prevent the expulsion of the nozzle 14 during dispensing, said nozzle can be made of a POK material. Furthermore, at least part of the button forming the housing 13 can be made of a polyolefin which is flexible enough to provide anchoring means for the rigid protrusion 18. Additionally, at least part of the button forming the shaft 12 can be made of COC-free polyolefin (COC=cyclic olefin copolymer) to feature less rigidity than the stem 6, thereby improving the mechanical strength and sealing of the assembly between the push button 7 and said stem.

In the embodiment shown in FIG. 1, the valve 8 of the stem 6 includes a piston 19 that is coaxially mounted around said stem and featuring an outer sealing surface 20 bearing against the internal chamber 2 to form, between said piston and the supply orifice 3, a product dosage chamber. The piston 19 also includes an inner sealing surface 21 that can be actuated and is movable with respect to at least one upstream orifice 11 of the dispenser path.

The piston 19 features an assembly cylinder 22 that slides around the stem 6, whereby said assembly is arranged to allow the reversible motion of the inner sealing surface 21 between a stable closed state and an imposed open state of the communications between the dispenser path and the internal chamber 2. In a variant (not shown), actuating the inner sealing surface 21 to switch between these two states can be achieved by deformation of the piston 19.

The piston 19 can be made of a material that is softer than that of the stem 6 and the body 1, in order to ensure that the internal chamber 2 is properly sealed at the inner 20 and outer 21 sealing surfaces, while achieving a low friction coefficient between said stem and said piston.

The pump includes a spring 23 that is located inside the internal chamber 2, between the stem 6 and the body 1, to return said stem to its stable state after its actuation on the dispensing stroke. In particular, the stem 6 is fitted with a low stopper 24, against which the spring 23 bears.

There is a trend whereby pumps entirely made of thermoplastic materials are in high demand. However, the pumps include a return spring with a force that can be equal to approximately 2 kg. To make such a spring, a coil spring made of steel wire is generally used. Until now, no plastic material could reproduce the performance of a steel spring.

However, the mechanical and chemical properties of the POK material mean that it can be used to make such a cylindrical spring. Therefore, the spring 23 can be made out of the POK material. Such a POK can be used to manufacture cylindrical springs of which the performance matches that made of metal wire, and perfectly compatible with the formulae implemented for perfumes and cosmetics; they are also perfectly clean, which is not the case of metal springs that are never completely washed of their drawing oils.

Furthermore, the sliding motion of the piston 19 is imposed by a pre-compression spring 25 that bears against the cylinder 22 and a radial protrusion 26 of the stem 6, whereby said pre-compression spring exerts and application force of the inner sealing surface 21 against the lower stopper 24, so as to ensure the proper sealing of the upstream orifices 11 between two dispensing operations.

In order to achieve sufficient creeping resistance and mechanical strength, the low stopper 24 can be made out of a POK material that is similar to that of stem 6, i.e. based on a POK material. Furthermore, the supply orifice 3 is located underneath a seat 27, with respect to which an inlet valve in the form of a ball 28 is reversibly moveable between an open state of said seat to allow the internal chamber 2 to be supplied, and a closed state of said seat.

To ensure optimal sealing in a closed state, the inlet valve and the seat 27 can be made of materials featuring different rigidities. For example, the seat 27 can be more flexible than the inlet valve.

Alternatively, and conforming with the invention, two other types of material may be selected for their chemical and mechanical features: polybutylene terephthalate (PBT) and polyamides (PA). A polyamide (PA) is a polymer featuring the amide functions —C(=O)—NH— that can result from the polycondensation between the carboxylic acid and amino functions. The properties of polyamides are close to that of the POM and they can be used as cosmetic packaging material. Numerous different polyamides can be used in cosmetic packaging. There are the PA46, the PA4T and the PA410, to mention but a few of the materials that are advantageous in terms of the intended use. However, polyamides are difficult to use in hot molds as they can cross-link inside the mold and make de-molding operations difficult. Tested polyamides therefore require some adaptations of the manufacturing process of parts intended for cosmetic packaging.

Another material is polybutylene terephthalate (PBT). PBT can be defined according to the following formula:

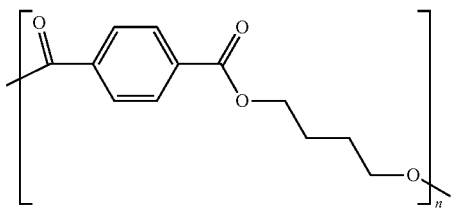

PBT features mechanical properties that are similar to that of POM, in particular in terms of mechanical strength. PBT also possesses chemical properties that are similar to that of POM. In particular, PBT can be used as a cosmetic packaging material because of its chemical compatibility with alcohol, which is frequently used in fragrances and lotions. PBT also offers good resistance to sterilisation by gamma and beta radiation. Indeed, POM becomes brittle at approximately 15 kGy, whereas PBT resists to sterilisation at up to around 50 kGy. Unlike POM, PBT does not salt out formaldehyde or any other degradation products considered as hazardous and/or carcinogenic substances.

However, the use of PBT in cosmetic packaging comes with certain constraints, in particular relating to the compatibility with the tools currently used for POM. Furthermore, PBT features a different shrinkage rate from that of POM. The shrinkage (plastic shrinkage) is the ability of a body to resume its normal state after a temperature increase and/or a plastic deformation. Weak shrinkage is required to achieve parts with high dimensional accuracy, and tight tolerance.

POM- and PBT-based parts achieved following de-molding operations do not have the same dimensions, because of different material shrinkage properties. Furthermore, PBT and POM do not react in the same manner at high temperatures, and the process must therefore be adapted in terms of thermal cycles.

The invention has been described above with its embodiments with no limitation to the general concept of the invention.

Many other modifications and variations will naturally come to a person skilled in the art, having given some thought to the various embodiments described in this application. These embodiments are provided as examples and should not limit the scope of the invention, which is determined exclusively by the claims below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A fluid dispenser system of a pressurized product for integration in cosmetic packaging, the system comprising at least one part made of poly-ketonic material made of a polyketone (POK), said POK being an aliphatic POK, wherein the POK features repetition patterns according to the following formula I:

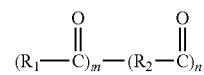

wherein m and n are integers that are greater than or equal to 1, and

R1 and R2, identical or different, each separately represents an alkylene group, replaceable with:

an alkyl group, an alkyne group, an aryl group, an hydroxyl group, an amine group, and amide group, a halogen atom, a carboxyl group, and in which the sequence of repetition patterns is one of random and ordered, wherein R1 is an ethylene group and R2 is a propylene group, wherein the n/m ratio is smaller than or equal to 1/4.

2. The system of claim 1, wherein the poly-ketonic material meets regulatory requirements applicable in cosmetics by not salting out hazardous carcinogenic substances after its degradation.

3. The system of claim 1, wherein the poly-ketonic material has mechanical properties that are not altered by beta and gamma radiations of up to at least 15 kGy.

4. The system of claim 1, wherein the poly-ketonic material has mechanical properties that are not altered by beta and gamma radiations of up to at least 250 kGy.

5. The system of claim 1, wherein the poly-ketonic material features thermal stability at up to at least 200° C.

6. The system of claim 1, wherein the poly-ketonic material features a shrinkage rate greater than or equal to 1.5% and lesser than or equal to 2.5%.

7. A dispenser system of a pressurized product, for integration in a cosmetic packaging, said system comprising at least one part made of poly-ketonic material made of a polyketone (POK), the dispenser system comprising a pump made out of the poly-ketonic material said POK being an aliphatic POK, wherein the POK features repetition patterns according to the following formula I:

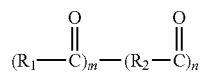

I wherein m and n are integers that are greater than or equal to 1, and

R1 and R2, identical or different, each separately represents an alkylene group, replaceable with:

an alkyl group, an alkyne group, an aryl group, an hydroxyl group, an amine group, and amide group, a halogen atom, a carboxyl group, and in which the sequence of repetition patterns is one of random and ordered, wherein R1 is an ethylene group and R2 is a propylene group, wherein the n/m ratio is smaller than or equal to 1/4.

8. The dispenser system of claim 7, wherein said pump includes a body, a stem and a push button mounted on said stem for reversibly actuating said stem in said body.

9. The dispenser system of claim 8, wherein the body of the pump is made of the POK material.

10. The dispenser system of claim 9 wherein the stem is made of the poly-ketonic material.

11. The dispenser system of claim 8, wherein the push button features a housing mounted a nozzle fitted with a dispensing orifice, wherein said nozzle is made of the poly-ketonic material.

12. The dispenser system according to any of claim 8, wherein a return spring in a stable state of the stem after actuation on a dispenser stroke is made of the poly-ketonic material.

* * * * *